Figure 1:
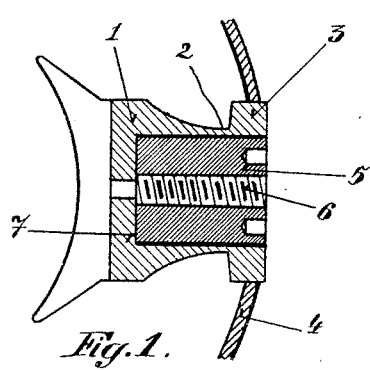

Jan. 24, 1933.  E. ROSENBERG  1,895,049

REGULATING POLE FOR ELECTRIC MACHINES

Filed Nov. 5, 1929

E. Rosenberg
INVENTOR

By: Marks & Clerk
Attys.

Patented Jan. 24, 1933

1,895,049

UNITED STATES PATENT OFFICE

EMANUEL ROSENBERG, OF WEIZ, AUSTRIA

REGULATING POLE FOR ELECTRIC MACHINES

Application filed November 5, 1929, Serial No. 404,988, and in Austria November 16, 1928.

This invention relates to regulating poles for electric machines. It is well known that the magnetic reluctance of an electric machine can be altered by the adjustment of a movable piece of magnetic material in a portion of the magnetic circuit, by means of which the effective iron cross-section is altered at one point. This device has been used for the regulation of the voltage of dynamos and for the regulation of the speed of motors, and is also more especially used in connection with exciters and dynamos for feeding electric arcs. It is described in my U. S. Patent 1,650,851, filed Sept. 28, 1926. The disadvantage of the arrangement hitherto known is that the screwing-out of the movable element for a certain definite distance has an entirely different effect according to what position of the movable element is taken as the starting position. When the movable element is completely screwed down the screwing-out to the extent of one complete turn alters the magnetic reluctance to a relatively far greater extent than the same amount of displacement after the movable element has been screwed out to a considerable distance. The phenomenon is perfectly analagous to that observable in connection with the passage of a liquid through a valve. An additional opening of the valve amounting to 1 mm. produces an entirely different percentual alteration in the flow of the liquid according to whether the valve is nearly closed or nearly open.

The present invention consists in the provision of a regulating pole in which the magnetic reluctance is altered by the adjustment of the movable element in such a manner that the alteration in the voltage, amperage, or output of the machine is approximately proportional to the extent of the displacement of the movable element. The stationary or the movable part of the regulating pole or both are provided with a concave surface, so that the minimum iron cross-section available at any one time for the magnetic flux decreases gradually from a very great to a very small value. Since only the magnetic reluctance of the regulating pole is altered by the displacement of the movable element, while all the other parts included in the magnetic circuit (armature, yoke, and air-gap between pole-shoes and armature) remain unaltered it is necessary to achieve an alteration of the cross-section in the regulating pole itself far greater than proportional to the displacement if a proportional alteration of the total reluctance is to be achieved. This is effected by the provision of a concave surface.

Examples of the embodiment of the invention are shown in the drawing, in which the figures show respectively longitudinal sections of regulating poles in accordance with the invention. The thickness of the wall of the cup-shaped part (1) of the pole is graduated down in such a manner that its external surface presents in section a concave curve. The thickness is greatest at the base of the cup, diminishes then rapidly, and is for instance at the position (2) only one tenth of that at the base. The rim (3) is thick and is welded or otherwise positively connected to the magnet frame. The movable element (5) of magnetic material is in its working part a purely cylindrical piston, which is capable of being screwed out on a screw (6) of magnetic or of non-magnetic material. When the movable element is situated as far as possible towards the left (Fig. 1) the magnetic flux flows from the yoke (4) through the rim (3), through the entire movable element (5) to the base-plate (7) of the pole, and the magnetic reluctance is at a minimum. When the movable element is screwed out to a slight extent the direct iron contact between the movable element (5) and the baseplate (7) is interrupted and an air-gap interposed at this point, while a bye-pass remains on the cylindrical surface between the movable element and the cup, which at first does not offer any too great reluctance on account of the large cross-section at the base of the cup. As the movable element is further screwed out an increasingly smaller cross-sectional area of the cup is presented to the magnetic flux. Each millimeter of displacement of the under surface of the piston from the base-plate to the position of smallest cross-section (2) produces an approximately equal relative effect.

Figure 2:
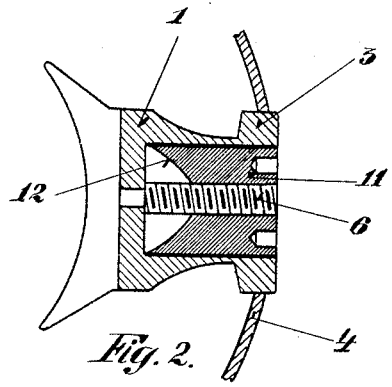

The form of construction shown in Fig. 2 differs from that of Fig. 1 in that the surface of the movable element (11) towards the base-plate is also provided with a concave surface (12).

Figure 3:
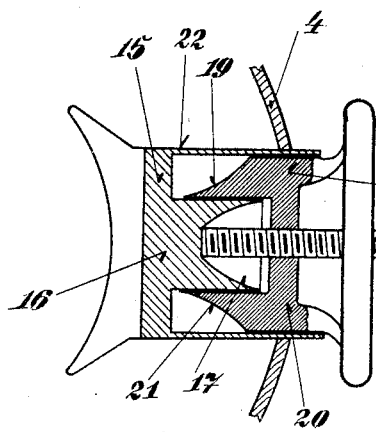

Another form of construction is shown in Fig. 3. The cup (15) is provided externally with a thin tube (22). The base-plate in the interior of the cup possesses an extension (16), which is outwardly cylindrical and hollowed out internally in such a manner that its inner surface in section presents a curved line (17). The movable element (18) is cylindrical internally and has a curved outside surface (19), so that the large cross-section at (20) is progressively reduced towards the position (21). When the movable element is screwed-in a large cylindrical contact surface and a large cross-section are presented to the flux, and the reluctance is consequently slight. As the movable element is withdrawn the contact surface and the cross section progressively diminish, until finally only the thin tube-shaped wall of the cup (15) remains in contact.

Figure 4:
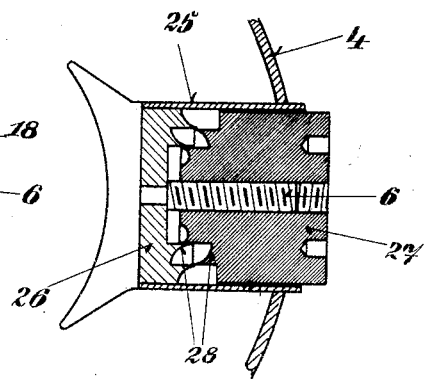

A form of construction with multiple contact surfaces is shown in Fig. 4. In this case an unmagnetic cup wall (25) is provided (e. g. a brass tube), the base-plate (26) is constructed with steps or stages and likewise the movable element (27). The steps are provided with concave surfaces (28). When the movable element is completely screwed-in a large cylindrical contact surface is presented at each of these steps, to which a comparatively large cross-section is added on all sides, so that the magnetic reluctance is slight. As the movable element is withdrawn both the cylindrical contact surfaces and the adjoining cross-sections progressively diminish.

For considerations of ease of manufacture the curves may be replaced by approximately straight lines.

I claim:—

1. A dynamo electric machine with a magnetic structure and a regulating part therein comprising a stationary and a movable element with a common axis and means to shift one element axially within the other, the stationary element having at right angles to the axis a section of magnetic material, large at one end and diminishing progressively to a small quantity.

2. A dynamo electric machine with a magnetic structure and a regulating part therein comprising a stationary and a movable element with a common axis and means to shift one element axially within the other, both elements having at right angles to the axis a section of magnetic material, large at one end and diminishing progressively to a small quantity.

3. A dynamo electric machine with a magnetic structure containing a pole piece and a regulating part connected with the pole piece comprising a stationary and a movable element with a common axis and means to shift one element axially within the other, the stationary element having at right angles to the axis a section of magnetic material, large at one end and diminishing progressively to a small quantity.

4. A regulating pole for electric machines comprising an annular stationary body with a wall presenting a large section of magnetic material at the base and a section diminishing up to a certain point with progressing axial distance from the base and another body axially movable within the annular member and means to shift the movable element within the stationary element.

5. A regulating pole for electric machines comprising an annular stationary body with a wall thick at the base and whose thickness diminishes up to a certain point with progressing axial distance from the base and another body axially movable within the annular member and means to shift the movable element within the stationary element.

6. A dynamo electric machine with a magnetic structure and a regulating part therein comprising a stationary and a movable element with a common axis and means to shift one element axially within the other, one of the elements having a section of magnetic material variable along the axis and possessing a concavely shaped surface produced by rotation of a curve round the axis 7. A dynamo electric machine with a magnetic structure and a regulating part therein comprising a stationary and a movable element of magnetic material with a common axis and in contact with each other along a cylindrical contact surface and means to shift one element axially within the other, one of the elements having a section of magnetic material variable along the axis and possessing a concavely shaped surface produced by rotation of a curve round the axis.

8. A dynamo electric machine with a magnetic structure and a regulating part therein comprising a stationary and a movable element with a common axis and means to shift one element axially within the other, both elements having a section of magnetic material variable along the axis and possessing a concavely shaped surface produced by rotation of a curve round the axis.

In testimony whereof I affix my signature.

EMANUEL ROSENBERG.